United States Patent [19]

Arcan

[11] Patent Number: 4,501,159

[45] Date of Patent: Feb. 26, 1985

[54] CONTACT GAUGE AND METHOD OF EMPLOYING SAME

[76] Inventor: Mircea Arcan, 42/22 Tagore St., Tel-Aviv, Israel

[21] Appl. No.: 409,836

[22] Filed: Aug. 20, 1982

[51] Int. Cl.³ .............................................. G01L 1/06
[52] U.S. Cl. .................................. 73/862.53; 73/800; 356/35
[58] Field of Search ...................... 73/762, 800, 862.53, 73/862.55; 356/32–35; 433/71; 350/371

[56] References Cited

U.S. PATENT DOCUMENTS

| | | | |
|---|---|---|---|
| 3,604,116 | 9/1971 | Shpuntoff | 433/71 |
| 3,906,800 | 9/1975 | Thettu | 73/862.55 X |
| 3,966,326 | 6/1976 | Brull et al. | 356/35 X |
| 4,324,547 | 4/1982 | Arcan et al. | 433/71 |

Primary Examiner—Charles A. Ruehl
Attorney, Agent, or Firm—Weiser & Stapler

[57] ABSTRACT

A contact gauge utilizable for determining contact pressure conditions between two bodies at their interface including a thin plastic sheet capable of memorizing an induced birefringence and a thin, load transmitting member attached to the sheet for inducing the birefringence therein. A method of employing the contact gauge for determining the contact pressure conditions between the two bodies also forms a part of the present invention.

25 Claims, 4 Drawing Figures

CONTACT GAUGE AND METHOD OF EMPLOYING SAME

FIELD OF THE INVENTION

This invention relates generally to the field of pressure measurement, and more specifically to a unique arrangement for determining pressure conditions at the interface between bodies, such as machine elements.

BACKGROUND ART

It has been suggested to indicate, or measure contact pressure distribution by employing electronic or mechanical pressure transducers. However, many of these transducers are quite large and bulky, and, even if miniaturized, it is difficult if not impossible to adapt for use in a limited space, such as at the interface between machine elements, (e.g. paper and metal rolling mills, pressing machines, ball or roller bearings, etc.).

Furthermore the simple presence of such transducers is disturbing the contact that has to be evaluated. An other limiting characteristic of the above situation is lack of access; so, light can not be directed to the gauge location, optical data can not be observed, electrical and mechanical connections can not be mounted.

Two methods using materials exibiting mechanical birefringence properties (photoelastic or photoplastic properties) have been suggested so far for measuring contact pressure distribution; both of them are using sheets of such materials and are converting pressures perpendicular to them into "in-plane" stresses or strains:

(a) One approach is disclosed in U.S. Pat. No. 3,966,326 issued to Brull and Arcan. In accordance with the teachings of this patent, the pressure transmitting member (a foot or a shoe e.g.) are transfering the load to a plurality of point-contact projections that are discretizing and transmitting the pressure stress to a photoelastic sheet.

The characteristics of this approach are:
using an elastic (photoelastic) sheet, a real-time response is obtained in a field of circular polarized light,
being induced by point-contact (axial-symmetric) projections, this response is exibiting a pressure pattern of circular isochromatics due to the axial symmetric deformation,
the contact intensity is given by the diameter of the first order isochromatic surrounding the contact point and calibration is possible in terms of local force,
at the contact point, the local values of the "in-plane" principal strains $\epsilon_1$ and $\epsilon_2$ are equal and so the shear strain $\gamma$ (equal to their difference) is zero, which means that the local birefringence is zero.

(b) An other approach is disclosed in U.S. Pat. No. 4,324,547 issued to Arcan et al to be applied in the dentistry field to evaluate bite characteristics. This method is using photoplastic material sheets exibiting important permanent birefringence (or memorized birefringence). The above mentioned property is needed to record the bite and the localized peak strains imparted to the sheet by the teeth in order to quantify, afterwards (in a field of polarized light) the bite characteristics. There is no real-time alternative analysis because no access for light and observation is possible during occlusion.

Hence the characteristics of this approach are:
using a photoplastic material, a memorized response is obtained,
the plastic material is locally extruded under the teeth loading, and the contact intensity is given by the peak value of birefringence, right at the contact points or regions,
at these contact points (because teeth are not axially symmetric), the two local principal strains $\epsilon_1$ and $\epsilon_2$ (in the plane of the sheet) are of different values and their difference $\gamma$ is providing the peak value of birefringence to be calibrated versus the local strain intensity (perpendicular to the sheet).

In the engineering field it is often desirable to quantitatively examine the contact pressure conditions, or distribution at the interface between machine elements, such as paper and metal rolling mills, pressing machines, meshing gear teeth, and the like. In fact, in the fields of Tribology (i.e. science of contact friction) and Interface Mechanics (static and dynamic loading—including explosive) the quantitative measurement of interface contact pressure distribution is very desirable. However, in many environments access to the interface is virtually impossible and, in most of these environments, the inclusion of a transducer between the surfaces to be investigated will disturb the normal contact pattern; thereby introducing significant error into the measurement. Clearly, the environment provided at the interface between machine elements does not permit the use of a real-time method for observing localized point-like projections effect of the general type disclosed in the '326 patent issued to Brull et al.

On the other hand such an environment is very different from the indenting one provided by the dental arches where the shapes of teeth are so different and difficult to define that a calibration in terms of stress or force is not possible.

DISCLOSURE OF THE INVENTION

In accordance with this invention a contact gauge employed for quantitatively evaluating contact pressure conditions at the interface between bodies such as machine parts includes a thin, flexible, elasto-plastic sheet for memorizing an induced birefringence to which an elongate, flexible, preferably linear load transmitting member is attached.

The features of the contact gauge are:
the load transmitting member is inducing in the plane of the sheet uniaxial deformation $\epsilon_1$.
it may be calibrated in terms of strain, stress, force, force per unit of length,
its geometry and flexibility makes it adaptable to many environments,
it is able to directly record the maximal values of stress or force unit The thin elasto-plastic sheet preferably is of the type described in the '547 patent issued to Arcan et al. This latter patent is incorporated herein by reference for its disclosure of the preferred elasto-plastic materials employable in this invention, as well as for its disclosure of representative polariscopes that can be employed to evaluate the strain imparted to the sheet through the load transmitting member in accordance with the method of this invention.

In particular, the thin elasto-plastic sheet is not-completely-elastic, is optically isotropic and exhibits mechanical birefringence.

In referring heretofore and hereinafter to a "not-completely-elastic" material, what is meant is a material which is elasto-plastic; such material responds to a localized impression imparted to it by the load transmitting member by retaining the impression as unchanged as possible after the load has been removed for at least a predetermined period of time sufficient to permit its analysis and, if desired, its recording.

In referring heretofore and hereinafter to a material which is "optically isotropic and exhibits mechanical birefringence", what is meant is a material which initially is not birefringent by virtue of being optically isotropic, but which become birefringent by application of localized stress.

Initially the material may also exibit some uniform optical anisotropy.

In accordance with this invention the internal stresses created in the elasto-plastic sheet by loading normal to it give rise to the phenomenon which is referred to here as mechanical birefringence. The varying internal stresses in the sheet are created by variations in the applied load, and these varying stresses are observed as color variations when examined with a magnifying polariscope.

Reference throughout the description of this invention, including the claims, to examining or measuring "contact pressure conditions" or "contact pressure distribution" refers broadly to measuring pressure, as well as other properties related to or affected by pressure, such as strain and force.

In order to obtain not only the desired effect of mechanical stress birefringence, but in order to also preserve the phenomena produced by loading for at least a time period sufficient for examination and, if desired, for recording, the material employed in this invention is not-completely-elastic, and is therefore said to exhibit photo-plastic memory. In accordance with this invention polarized light is employed to measure the memorized birefringence created in the elasto-plastic sheet by the load transmitting member attached to said sheet.

The contact gauge of this invention generally is quite thin, and is very sensitive to the application of stresses perpendicular to its plane.

A minimum number of contact gauges will be positioned at the interface of the surfaces where contact has to be investigated in order both to provide stability of the contact and to avoid distorting the pressure distribution (e.g. if symmetry of loading and geometry does exist, then just two gauges are needed).

In summary, the sensitivity of the contact gauge of this invention to perpendicular strain, or pressure-induced strain, is realized by transforming it (in the sensitive elasto-plastic sheet) into an in-plane, axial strain by indentation with the thin, flexible elongate load transmitting member; this axial strain being measurable as a memorized birefringence.

Other objects and advantages of this invention will become apparent by referring to the Description of the Best Mode of the Invention which follows, taken in conjunction with the drawings.

BRIEF DESCRIPTION OF THE DRAWINGS

In the several views provided, like reference numerals denote similar structure.

DESCRIPTION OF THE BEST MODE OF THE INVENTION

Figure 1A:
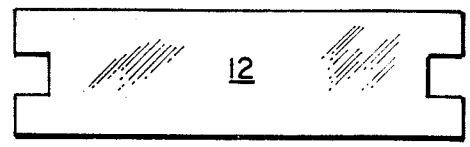
FIG. 1a being a plan view of the plastic memorizing sheet.
Figure 1:
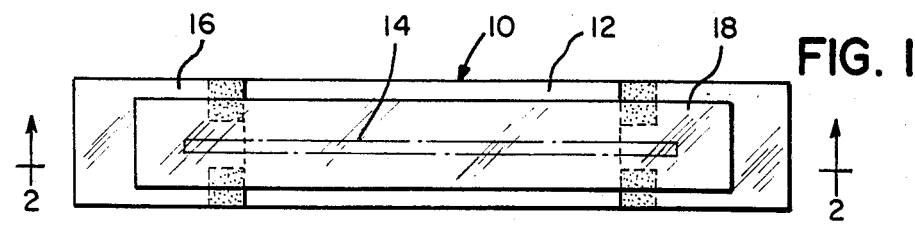
FIG. 1 is a plan view of a contact gauge in accordance with this invention.
Figure 2:
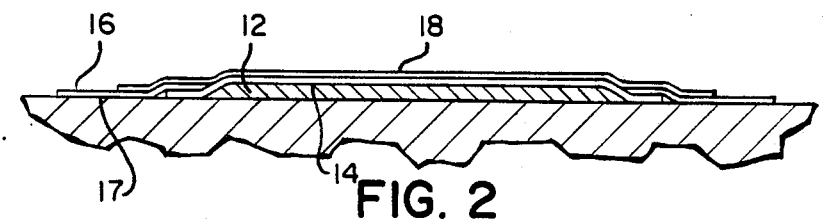
FIG. 2 is a sectional view along line 2—2 of FIG. 1.

Referring to FIGS. 1 and 2, a contact gauge 10 in accordance with this invention includes a thin plastic sheet 12 that is not-completely-elastic, is optically isotropic, or uniformly anisotropic, exhibits and memorizes mechanical birefringence. Suitable materials exhibiting these properties are polymers, among which polyamids such as nylon or polyethylene are preferred. The gauge further includes a thin, load transmitting member 14, in the form of a thin tab or wire. As illustrated, the load transmitting member 14 is adhesively secured to the upper surface of the sheet 12 by thin, adhesive tape members 16. These adhesive tape members firmly attach the load transmitting member 14 to the upper surface of the elasto-plastic sheet 12, and also extend beyond the sheet to provide adhesive surfaces 17 for attaching the gauge to a desired surface, as will be explained in greater detail hereinafter. If desired, a thin protecting sheet 18 may be positioned over the load transmitting member 14.

The thin elasto-plastic sheet preferably is soft; having a yield point between 100–600 kg/cm$^2$ and a Young's modulus of from about 1,000–5,000 kg/cm$^2$. Most preferably the sheet is very thin; having a substantially uniform thickness of from about 0.05 mm to about 0.30 mm.

The load transmitting member 14 must be capable of accurately transmitting the applied load to the plastic sheet. To achieve this result the load transmitting member 14 preferably is in the form of an elongate tab, or wire, having a Young's modulus not less than 25000 kg/cm$^2$ (i.e. at least 5 times the Young's modulus of the plastic sheet 12). The application of a high interface pressure to the gauge will cause the load transmitting member 14 to press into the substantially planar surface of the thin plastic sheet 12, and thereby provide a localized indented region of uniaxial strain which can be evaluated with a magnifying polariscope.

When an elongate, thin tab 14 is employed it preferably has a width in the range of about 0.5 mm to about 1.0 mm, and a thickness in the range of about 0.04 mm to about 0.25 mm. Most preferably when a thin wire is employed the diameter should be in the range of about 0.04 mm to about 0.25 mm. The role of the tab or wire 14 is to transmit the load imparted to it to the plastic sheet 12, and thereby indent the sheet along the particular line, or direction to be measured or investigated. The tab 14, which is wider than the wire, is preferred under high pressure conditions to effectively distribute the load. Under lower pressure conditions the thinner wire is preferred, for higher sensitivity.

The two adhesive tape members 16, located at opposite axial ends of the sheet 12, preferably are very thin, on the order of about 0.03 mm., so as to prevent their interference with, or disturbance of the contact pressure measurements to be made.

The stressed indented regions, when viewed under polarized light, will exhibit color variations distinctive of the particular strain distribution. By the use of suitable calibration charts it is possible to determine the stress or force distribution from the particular colors viewed under polarized light.

To further explain, the memorized birefringence in the elasto-plastic sheet 12 is examined by using a magnifying polariscope of either the reflection or transmission type. Both types of polariscopes are well known, and their use is described in the '547 patent to Arcan et al. A table calibrated in strain, stress or total force can be employed to translate the particular color of the birefringence into the particular pressure-related parameter being investigated.

Figure 3:
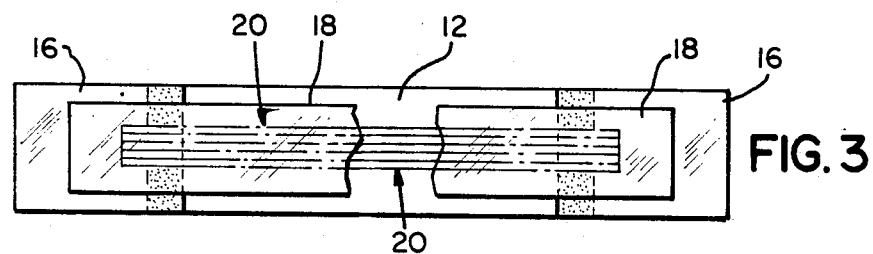
FIG. 3 is a plan view of a contact gauge in accordance with this invention, showing an alternative embodiment load transmitting member.
Figure 4:
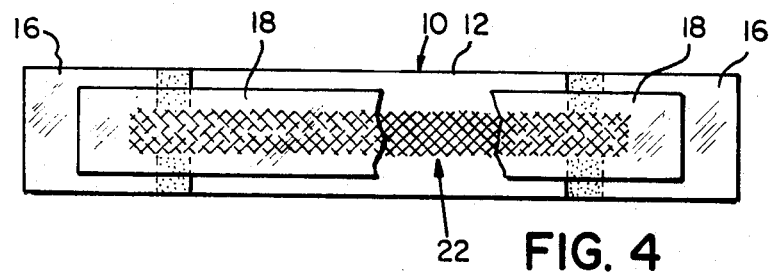
FIG. 4 is a plan view of a contact gauge in accordance with this invention, showing another alternative embodiment load transmitting member.

It is important in this invention that the load transmitting members 14 be configured to impart substantially linearly directed indentations (as opposed to "point" indentations) into the surface of the sheets engaged by said members to provide the desired transformation of the perpendicular stresses imparted to the load transmitting members 14 into measurable, in-plane uniaxial strains. Although the embodiment selected for illustration in FIGS. 1 and 2 employs a single, elongate, linearly extending load transmitting member 14 in the construction of the contact gauge 10, other arrangements can be employed. For example, an elongate load transmitting member 14 can be bent into a substantially U-shaped configuration. Also, several elongate members can be attached to the sheet in different geometric patterns (e.g. triangular, square, V-shaped, etc.). A plurality of small linear uniform members 20 may be utilized as illustrated in FIG. 3. A plurality of members may be combined to develop a uniform grid 22 (FIG. 4) of wires, tabs or small cylinders. Other arrangements also are possible provided that they impart uniaxial (i.e. unidirectional) strain regions into the plastic sheet 12. The important feature of the invention is that the individual load transmitting member(s) be thin, flexible, elongated, and preferably linear, in a direction substantially normal to the applied load.

It should be understood that this invention has utility in providing quantitative information with respect to contact pressure conditions at the interface of a wide variety of machine parts or other objects.

Indeed, the invention is not limited to use at interfaces of physical objects. The pressure exerted by a fluid, such as air, upon a surface can also be detected, by mounting a high-sensitivity embodiment of the gauge on that surface and exposing it to the fluid pressure.

In all cases, the resulting maximal pressure indication is "read" either by removing the gauge and observing it in a suitable transmission polariscope, or in-situ using a magnifying reflexion polariscope.

Although the invention has been described with a certain degree of particularity, it is understood that the present disclosure has been made only by way of example and that numerous changes in the details of construction and the combination and arrangement of the parts may be resorted to without departing from the spirit and scope of the invention.

What is claimed is:

1. A contact gauge adaptable for determining pressure conditions at the interface between two bodies, said contact gauge including a thin plastic sheet which is not-completely-elastic, is optically isotropic, exhibits and memorizes mechanical birefringence, and an elongate flexible load transmitting member attached to said sheet for indenting and inducing uniaxial deformation in the plane of the sheet in response to a compressive force applied to said member.

2. The contact gauge of claim 1 wherein said load transmitting member is substantially linear.

3. The contact gauge of claim 1 including adhesive means for attaching the load transmitting member to the plastic sheet.

4. The contact gauge of claim 3 wherein said adhesive means includes an exposed adhesive surface for attaching the gauge to a desired surface.

5. The contact gauge of claim 1 wherein the plastic sheet has a thickness of from 0.05 mm to 0.30 mm.

6. The contact gauge of claim 5 wherein the plastic sheet has a Youngs' modulus of from 1,000 to 5000 kg/cm$^2$.

7. The contact gauge of either claim 1, 5 or 6 wherein the thickness of the load transmitting member is no greater than 0.25 mm.

8. The contact gauge of claim 7 wherein the load transmitting member is a tab having a width up to 1.0 mm.

9. The contact gauge of claim 7 wherein the load transmitting member is a substantially cylindrical wire having a diameter no greater than 0.25 mm.

10. The contact gauge of claim 7 wherein the load transmitting member has a Young's modulus not less than 25,000 kg/cm$^2$.

11. The contact gauge of claim 1 wherein said plastic sheet is substantially uniformly optically anisotropic before being subjected to the applied force.

12. The contact gauge of claim 1 wherein said plastic sheet has highly uniform thickness.

13. The contact gauge of claim 1 wherein the memorized birefringence is recorded in the form of isochromatics.

14. The contact gauge of claim 1 wherein a thin protecting sheet of material is positioned on the load transmitting member.

15. The contact gauge of claim 14 wherein the thin protecting sheet is of a material presenting a Young modulus of at least 25.000 Kg/cm$^2$.

16. The contact gauge of claim 1 wherein the load transmitting member is made of a plurality of small linear uniform members.

17. The contact gauge of claim 16 wherein the plurality of members is a flexible, uniform grid of wires, tabs or small cylinders.

18. The contact gauge of claim 1 wherein said compressive force is applied perpendicular to the plane of said sheet.

19. A contact gauge adaptable for determining pressure conditions, said contact gauge including a thin plastic sheet which is not-completely-elastic, is optically isotropic, exhibits and memorizes an induced birefringence, and an elongate flexible load transmitting member attached to said sheet for indenting and inducing uniaxial deformation in the plane of the sheet in response to a compressive force applied to said member.

20. The contact gauge of claim 19 wherein the load transmitting member has a Young's modulus at least 5 times the Young's modulus of the plastic sheet.

21. The contact gauge of claim 19 or 20 including adhesive means for attaching the load transmitting member to the plastic sheet.

22. The contact gauge of claim 19 wherein said compressive force is applied perpendicular to the plane of said sheet.

23. A method for determining contact pressure conditions at the interface between two bodies, said method including the steps of:

attaching an elongate thin and flexible load transmitting member to a thin memorizing plastic sheet capable of memorizing a birefringence induced therein through the load transmitting member, thereby forming a contact gauge;

placing the plastic sheet, with the load transmitting member attached thereto, at a location corresponding to the interface between the bodies when said bodies are brought into engagement with each other;

bringing the bodies into engagement with each other under pressure with the contact gauge therebetween for causing the load transmitting member to indent the plastic sheet, induce uniaxial strain into its plane and thereby induce a birefringence therein;

maintaining the pressure between the bodies for a predetermined period of time;

separating the bodies; and examining the birefringence induced in the sheet and using a table of calibration in terms of strain, stress or force for mechanical quantification.

24. The method of claim 23 including positioning at least three contact gauges at a location corresponding to the interface between the bodies prior to bringing the bodies together under pressure for inducing the birefringence in the plastic sheets.

25. The method of claim 23 including the step of adhesively securing the contact gauge to a surface of one of the bodies prior to bringing the bodies into pressure engagement with each other.

* * * * *